INVENTOR.
Royal C. Tabordon
BY Stanley Binish
ATTORNEY

April 19, 1966 R. C. TABORDON 3,246,777
SPRING-POWERED TAIL GATE ELEVATOR
Filed March 19, 1964 5 Sheets-Sheet 3
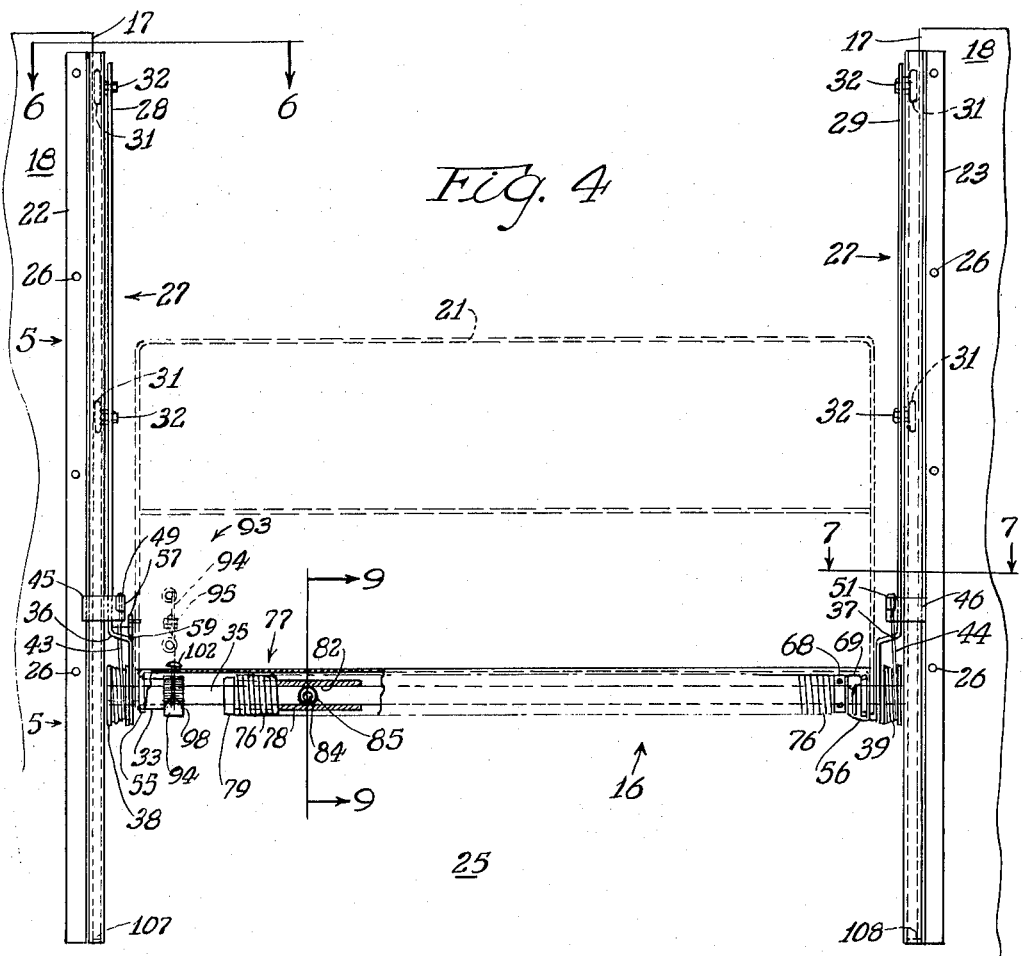
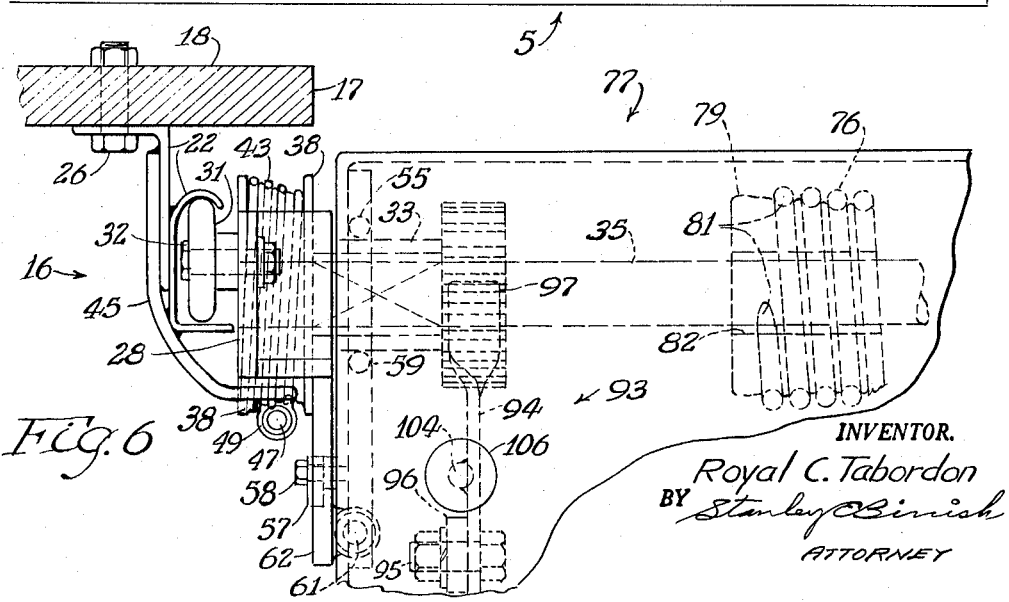
INVENTOR.
Royal C. Tabordon
BY Stanley C. Sinish
ATTORNEY April 19, 1966  R. C. TABORDON  3,246,777
SPRING-POWERED TAIL GATE ELEVATOR
Filed March 19, 1964  5 Sheets-Sheet 4

INVENTOR.
Royal C. Tabordon
BY
ATTORNEY

April 19, 1966  R. C. TABORDON  3,246,777
SPRING-POWERED TAIL GATE ELEVATOR
Filed March 19, 1964  5 Sheets-Sheet 5
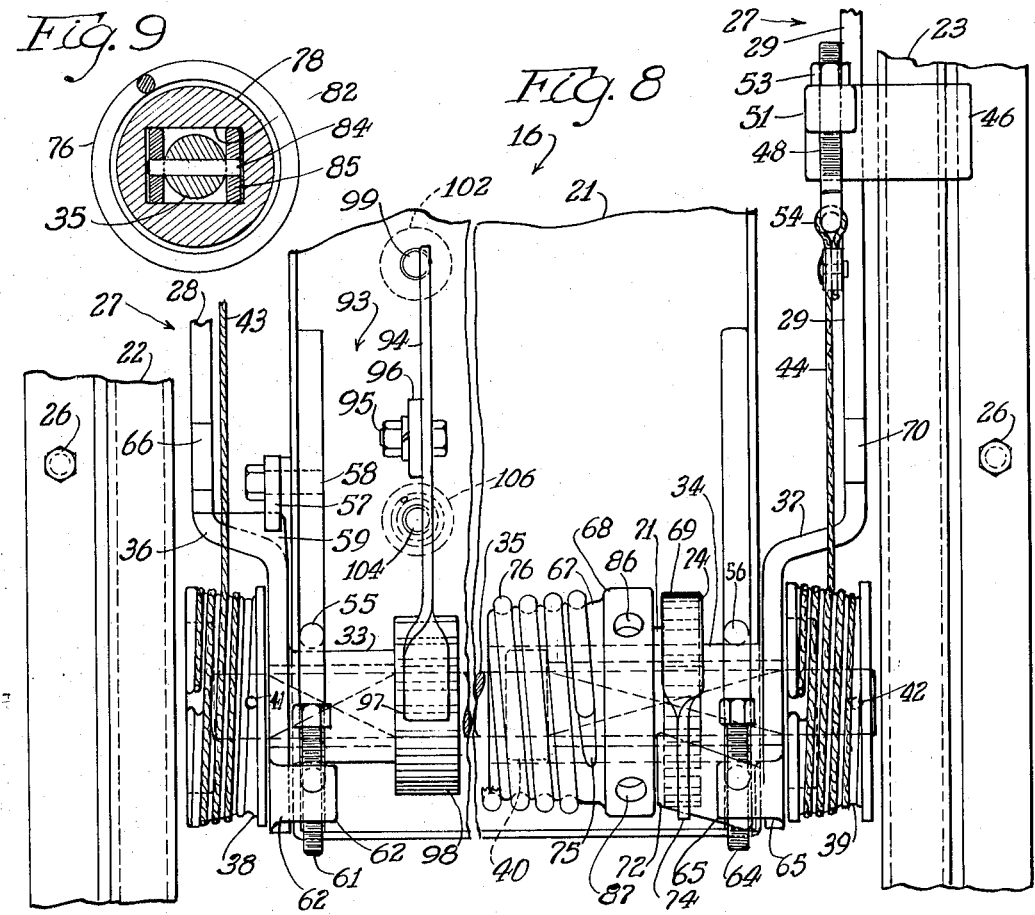
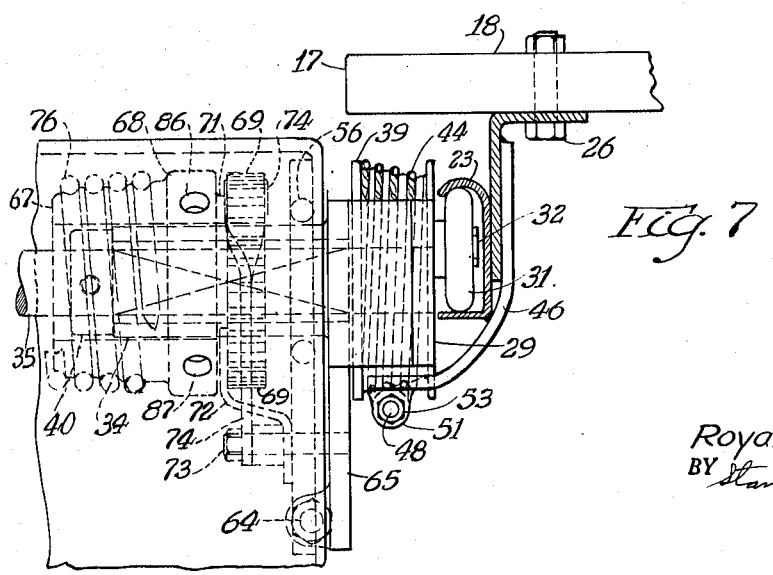
INVENTOR.
Royal C. Tabordon
BY
ATTORNEY

United States Patent Office 3,246,777
Patented Apr. 19, 1966

3,246,777
SPRING-POWERED TAIL GATE ELEVATOR
Royal C. Tabordon, Box 65, Casco, Wis.
Filed Mar. 19, 1964, Ser. No. 353,042
10 Claims. (Cl. 214—75)

This invention relates generally to tail gate elevators and more particularly to a tail gate elevator controlled by the weight of the operator.

The purpose of this invention is to provide a tail gate elevator that avoids the costly investment and installation charges that usually attend the acquisition of a conventional tail gate elevator, such as those hydraulically operated, or embodying involved remote controlled mechanical linkage.

Trucking vehicles very often deliver and receive objects which cannot be placed thereon and removed therefrom, with manual ease. To enable the handling of such loads, an elevatable platform is incorporated in the truck structure operative to raise the load to the level of the truck bed to which the load can then be easily transferred. In like manner, loads from the truck can be transferred to the associated elevatable platform, and thence lowered to the ground.

An object of this invention is the provision of a tail gate elevator that is operably controlled by the weight of the operator;

Another object is to provide a tail gate elevator that is automatic in operation, and self-contained;

Still another object of this invention is the provision of a tail gate elevator that is spring powered;

Yet another object is to provide a tail gate elevator that is spring and operator-weight powered;

A further object of this invention is the provision of a tail gate elevator means whereby the tail gate of a truck can be arranged to be easily elevated and lowered, as well as to function as the tail gate for the truck;

Still a further object is to provide a tail gate elevator embodying novel hold-down lock means; and Yet a further object of this invention is the provision of a tail gate elevator that is capable of extraordinary safe speed of operation permitting almost instantaneous raising or lowering of the elevator platform and its load.

Another object is to provide a tail gate elevator that is simple and durable in construction, and inexpensive in cost.

Other specific objects and many of the attendant advantages of this invention will be readily appreciated as the same becomes better understood by reference to the following detailed description when considered in connection with the accompanying drawings in which like reference numerals designate like parts throughout the figures thereof and wherein:

FIG. 4 is a front elevation view of the tail gate elevator, mounted on fragmentary portions of the rear end of a truck vehicle, and showing the tail gate platform in a down or open position, and in a closed dotted line position;

FIG. 6 is a fragmentary plan view taken on line 6—6 of FIG. 4, with the tail gate shown in down position;

FIG. 7 is a fragmentary section view taken on line 7—7 of FIG. 4, but with the tail gate shown in down position;

FIG. 8 is an enlarged fragmentary elevation view of the tail gate elevator, showing the gate platform in closed position, and the operative elements between the cables in enlarged proportions; and FIG. 9 is a section view taken along line 9—9 of FIG. 4.

Figure 1:
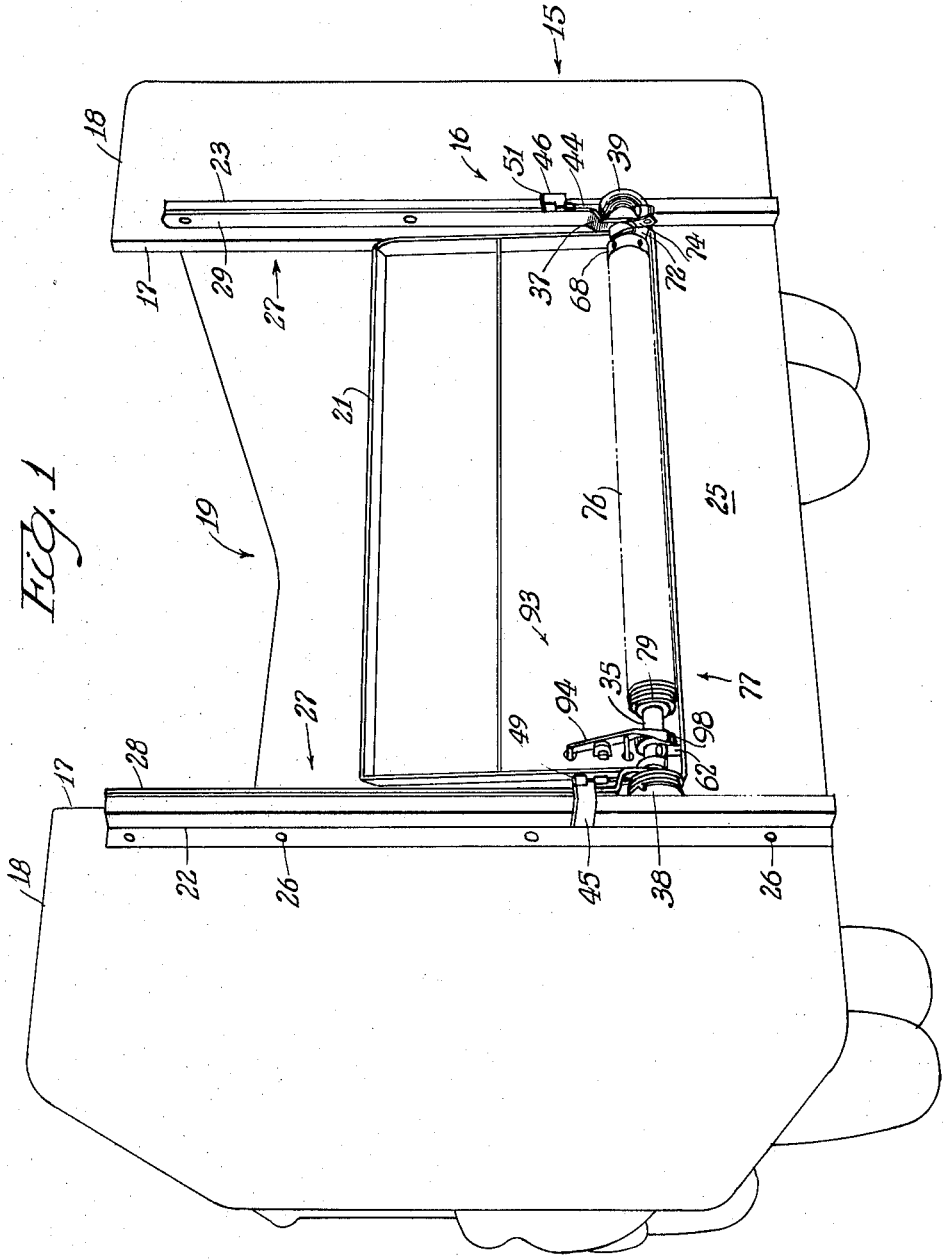
FIG. 1 is a perspective view of a truck vehicle showing the tail gate elevator arrangement installed on the rear end of such truck, and the tail gate thereof disposed in an upright, folded or closed position.

Referring now to the drawings, wherein like reference characters designate like or corresponding parts throughout the several views, there is shown in FIG. 1 a truck vehicle generally indicated at 15, on the rear end of which is installed a tail gate elevator assembly generally indicated at 16, comprising fixed guideway means and elevatable platform means guidably movable therein.

An opening, such as indicated by vertical margins 17, is provided in the rear end wall 18 of the truck box generally indicated at 19.

Said opening 17 is provided with a movable closure or tail gate 21. Such tail gate is arranged and constructed to function in its upright or closed position as a tail gate, and in its horizontal or open position as an elevator platform, as hereinafter described.

To the rear end wall 18 of the truck box 19, and adjacent the vertical margins of opening 17 thereof, are fixed a pair of spaced vertical channeled guideways 22 and 23, respectively, extending from the top portion of said rear end wall 18 downwardly to a point below the truck bed 24 and onto the truck skirt 25. Said guideways are secured to the rear end wall 18 by bolt and nut means such as indicated at 26. The open faced guideway channels are turned toward each other.

Carriage means, such as indicated generally at 27, is provided to reciprocate vertically in said guideways 22 and 23.

Said carriage means comprises a pair of elongated bars or guide blocks 28 and 29 disposed vertically adjacent the guideways 22 and 23, respectively, and associated therewith through means of rollers, such as indicated at 31, fitted in said guideways, said rollers being rotatably mounted on trunnions, such as indicated at 32, projecting from said elongated bars. Apertures are provided in the bottom end portions of said bars 28 and 29, and bearing sleeves are welded axially thereto and therearound and project toward each other, such as indicated at 33 and 34, respectively, to receive shaft 35 rotatably journalled therein and thereacross. See FIGS. 6, 7 and 8. Said bearing sleeves are provided with suitable bearing inserts. The above described carriage means 27 is guided for vertical reciprocation in said guideways, and comprises part of the elevatable platform means hereinafter described as follows.

The lower end portions of said elongated bars 28 and 29 are bent and offset inwardly, as at 36 and 37, to provide clearance for cable drums, hereinafter described, mounted on the ends of shaft 35, as hereinafter described. Said offset portions are disposed inwardly of and adjacent such cable drums.

A stop collar 40 is fixed on shaft 35 by means of a set screw to prevent longitudinal movement inwardly along the shaft, of said carriage bar 29 and attached sleeve 34.

Such cable drums or fuzees 38 and 39 are similarly oriented and are fixed on the ends of shaft 35, as by set screws 41 and 42 respectively. Such fuzees are conoidal spirally grooved pulleys or drums having cables, such as indicated at 43 and 44, fixed thereto and wound spirally therearound, received in said spiral grooves, and having the opposite ends thereof anchored to brackets 45 and 46 fixed on guideways 22 and 23, respectively. See FIGS. 5, 6, 7 and 8.

Said cables 43 and 44 are adjustably anchored to said fixed brackets through means of threaded hooks 47 and 48, received in sleeves 49 and 51 welded to said brackets 45 and 46, and nuts 52 and 53 threadedly engaged on said threaded hooks and bearing on the upper ends of said sleeves. The cables are provided with eyes or loops at the ends thereof, such as indicated at 54 which engage with said hooks.

The tail gate platform 21 has its rear end portion supported on said bearing sleeves 33 and 34, and is pivotally mounted thereon for open and closed oscillation, through means of U-bars 55 and 56 disposed therearound, respectively, and welded to the underside of said platform 21. The platform 21 is slightly recessed to conform to and receive said bearing sleeves at said support points.

The tail gate platform 21 is latched in its upright or closed position for road travel by a pivotal gravity latch bolt 57 pivoted to the platform 21 by means of pin 58. Said latch is engageable with latch catch 59 fixed on carriage bar 28, and held in such up or closed position until manually released.

The pivotal tail gate platform 21 is stopped at open or horizontal position by adjustable means comprising set screw 61 threadedly engaged in arm 62 projecting frontally from the lower end of carriage bar 28. A lock nut 63 is provided for said set screw 61. In its down or horizontal position, the tail gate platform engages and rests on the top end of said set screw 61.

Similar coacting stop means are provided on the opposite side of the carriage 27 to stop and support the tail gate platform 21 in said open or horizontal position, such as by means of set screw 64 threadedly engaged in arm 65 projecting frontally from the lower end of carriage bar 29.

Lugs 66 and 70 are provided, projecting from carriage bars 28 and 29, to engage with the underside of brackets 45 and 46, respectively, to stop the upward movement of the carriage and associated elevator platform 21 at the elevation of the truck bed indicated at 24. See FIGS. 8, 5 and 2.

A tightener sleeve 67, provided with a flange 68, is disposed over the free end of bearing sleeve 34 for rotation thereon. See FIGS. 7 and 8. A ratchet wheel 69 is formed integrally with said sleeve at said flange and axially therewith. An annular groove 71 is provided between the flange 68 and ratchet wheel 69 to slidably receive the free end of an offset finger element 72 fixed at its other end to carriage bar arm 65 by means of stud and nut means 73. See FIGS. 7 and 8. Said finger 72, slidably engaged in annular grooves 71, guides said tightener sleeve 67 in circumferential rotation around bearing sleeve 34, and otherwise prevents longitudinal movement of said tightener sleeve 67 relative to bearing sleeve 34.

The ratchet wheel 69 and associated tightener sleeve 67 are held engaged in any preselected position by means of a pawl 74 secured to the carriage bar arm 65 by means of stud and nut means 73.

The tightener sleeve 67 is slightly conoidal and spirally grooved, as at 75, onto which one end of torsion spring 76 is received threadably advanced and thus secured on the tightener sleeve 67. The torsion spring 76 surrounds shaft 35.

The other free end of torsion spring 76 is similarly threadably engaged on a spring growth compensating sleeve means, generally indicated at 77, which is rotatably and slidably mounted on shaft 35. See FIGS. 4 and 5.

Said compensating sleeve means 77, see FIGS. 4 and 9, comprises an elongated sleeve 78 having one end conoidally formed as at 79 and spirally grooved as at 81 to receive the remaining free end of torsion spring 76 threadably advanced and engaged thereon. The compensating sleeve 77 is provided with an axial passageway, square in cross-section at the conoidal end portion, as indicated at 82, and terminating in a short bore section as indicated at 83, to loosely receive shaft 35 therethrough.

A pin 84 is fixed diametrally through shaft 35. The ends of said pin project from said shaft and provide lateral trunnions for rollers rotatably mounted thereon, respectively, as indicated at 85.

The rollers engage the walls of the squared passageway and communicate the rotational motion of the shaft 35 to the compensating sleeve 77 so that such sleeve rotates with said shaft, and thus this end of the torsion spring can be considered, in effect, rotatively-rigid with said shaft.

Also, in the event of growth lengthening or shortening of the torsion spring, due by increasing or decreasing the total number of winds of said torsion spring, as resulting from the operative raising or lowering of the elevator platform, the slidable or rollable mounting of said compensating sleeve 79 on shaft 35 allows said sleeve to move longitudinally of said shaft to compensate for such growth.

To adjust the tension in torsion spring 76, the elevator platform is swung to its up or closed position, with the carriage bar stop lug 66 urged against bracket stop 45, to provide convenient access to the tightener sleeve 67.

To increase the spring tension, a bar is inserted in an upper recess 86 in the flange 68 of tightener sleeve 67 and such sleeve rotated downwardly. Thereupon the pawl 74 will engage a new position or ratchet tooth, on ratchet wheel 69, and thus hold the resulting increased tension.

To decrease the spring tension, the bar is inserted in a lower recess 87 and the bar eased down slightly to release pawl 74. With the pawl 74 held disengaged from its ratchet wheel, and the bar rotated upwardly, the pawl is permitted to engage a new position or ratchet tooth, and thus hold the resulting decreased tension.

It is preferred that the pawl be advanced or retracted two teeth at a time until the desired tension is reached.

The torsion spring is preferably tensioned, at least, so that stop lug 66 is initially urged against bracket stop 45 with a counterbalancing force substantially equal to the weight of the load to be placed on the platform 21, comprising the combined weight of the hand truck or cart 91 and the water softener bottle 92 and contents therein.

In view of the fact that the operator is also to be carried on the platform, and whose added overbalancing weight functions to force the platform downwardly against the tension of the torsion spring 76, it is desirable to compensate for a portion of this added operator weight, to lessen both the downward speed of the platform and the impact upon being stopped. This is accomplished generally by tensioning the torsion spring to initially urge stop lug 66 against bracket stop 45 with a counter force substantially equal to the weight of the load to be placed on the platform plus a fraction of the weight of the operator, or in particular, a counter force substantially equal to the weight of the load to be placed on the platform plus that portion of the weight of the operator to be carried on said platform which is in excess of the weight necessary to force down said platform substantially to a predetermined elevation, against the tension of said torsion spring.

If the torsion spring tension is properly adjusted and set, the elevator platform, with its load, will drop rapidly but relatively gently to the ground level, when the operator steps thereon.

To hold the elevator platform at ground level, ratchet mechanism, generally indicated at 93, is provided. See FIGS. 1, 4–8. Said ratchet mechanism comprises an elongated pawl 94 pivotally mounted, intermediate its ends, by pin means 95, to a bracket 96 depending from the underside of the elevator platform.

The detent 97, at the end of pawl 94, engages with the slanted or undercut teeth on ratchet wheel 98 which is fixed on shaft 35 by means of a set screw.

A ratchet engagement pedal 99 is provided extending upwardly from the end of elongated pawl 94, passing through an aperture 101 in platform 21, extending thereabove, and terminating in a button 102.

A spacing compression spring 103 is disposed around the pedal 99 to bear against the top surface of platform 21 and shoulder against the underside of button 102, to urge and space the pedal button upwardly off the platform 21, thereby to maintain an inoperative clearance of associated pawl detent 97 from the teeth of ratchet wheel 98, when the detent is not operatively engaged with ratchet wheel 98.

To hold the descended elevator platform at ground level, the operator will step on button 102 thereby moving the pawl detent 97 from its clearance position to a position against the teeth of ratchet wheel 98. The operator will then move the load off the platform, to the ground. The operator's foot must be kept on the button until the load is removed from the platform and delivered to the ground. At the instant the platform is relieved of the load, the tension in the torsion spring reacts and thereby firmly engages the nearest ratchet wheel tooth with the pawl detent 97, and thus the elevator platform is held at ground level. The operator then steps off the platform and onto the ground himself.

A release pedal 104 is provided, projecting from said elongated pawl 94 at a point intermediate the pivot pin 95 and the pawl detent 97, and extending upwardly through an aperture 105 in platform 21, and extending thereabove, and terminating in a button 106. See FIGS. 5 and 6.

To elevate the platform from the ground level, the operator steps onto the platform and pulls the substantially same load onto the platform beside him. He then steps firmly on said release pedal button 106, which depresses the pawl 94, and disengages the pawl detent 97 from the teeth of ratchet wheel 98. He then steps up to the truck bed, and as his weight is being shifted from the platform to the truck bed, the movable platform means commences to rise, and the platform thereof is stopped at the truck bed level by means of carriage bar stop lug 66 engaging stop bracket 45. The rising speed of the platform means is controlled by the alacrity or promptness with which the operator shifts his weight from the platform and unto the truck bed. It can be fast or slow as the operator wishes.

To prevent the platform means running out of and beyond its guideways, on its descent run, stop lugs indicated at 107 and 108, respectively, see FIG. 4, are provided in the lower end of the guideways to stop the rollers 31 thereagainst.

Figure 2:
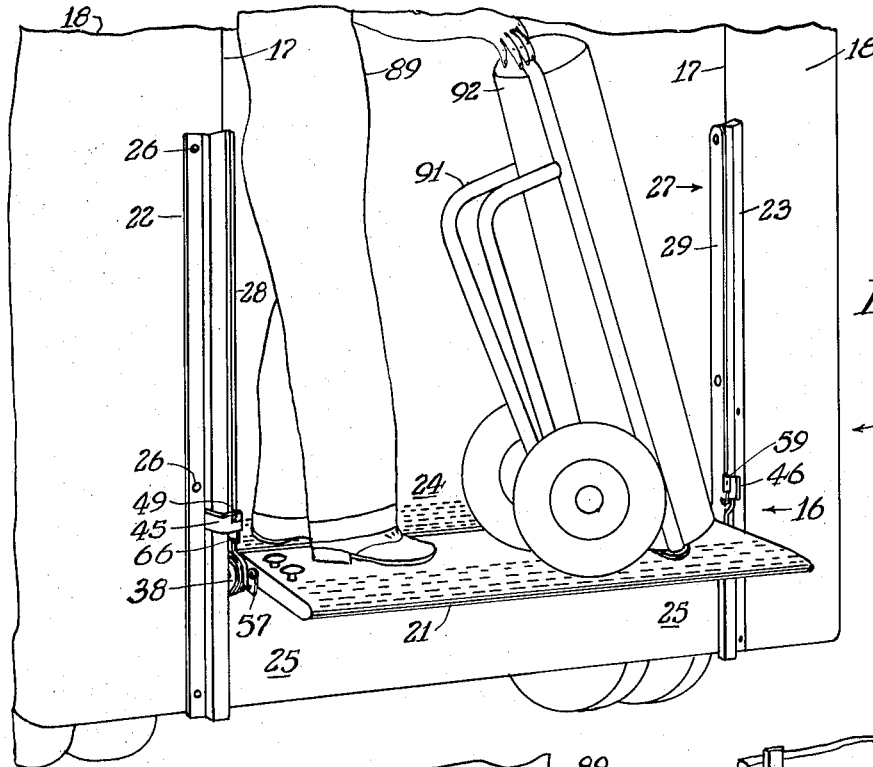
FIG. 2 is a view substantially similar to FIG. 1, but showing the tail gate thereof in a horizontal, down or open platform position, and having a load supported thereon, and a man operator in the process of shifting his weight from the bed of the truck to the tail gate platform.
Figure 5:
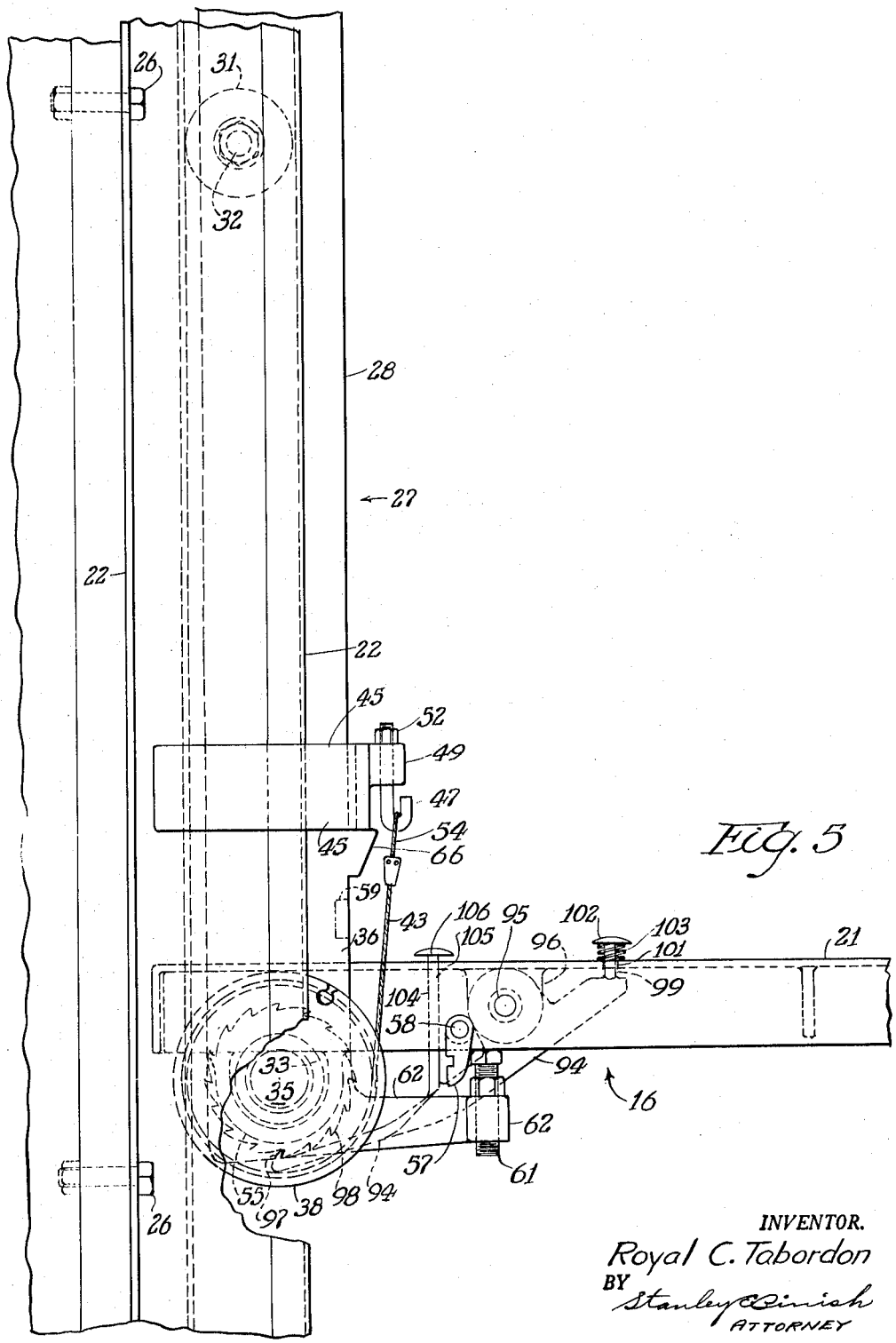
FIG. 5 is an enlarged fragmentary side elevation view taken on line 5—5 of FIG. 4, but showing the gate platform in open position.

Operation: The operator first manually releases latch bolt 57 from latch catch 59 and allows the closed tail gate platform 21 to swing down to an open or horizontal position, such as indicated in FIGS. 2 and 5, stopped in said horizontal position by engagement with set screw 61, ready to receive a load thereon.

In this elevated or raised position, the elevatable platform means is initially urged against bracket stop 45, by torsion spring 67, with a counter force as hereinbefore described.

The operator then mounts the truck bed, loads one of the charged bottles 92 onto the hand truck and pushes it onto the raised elevator platform 21. He then steps thereon, himself, being careful to place on foot thereon, first, and then quickly drawing the other foot thereon. See FIG. 2.

If the tension in the torsion spring is properly adjusted and set, the elevatable platform means, responsive to the imposed weight of the operator, will drop rapidly but gently to the ground.

During such descent of the elevator means, the torsion spring 76 is progressively additionally tensioned until a stop is encountered, or a balanced condition reached.

Figure 3:
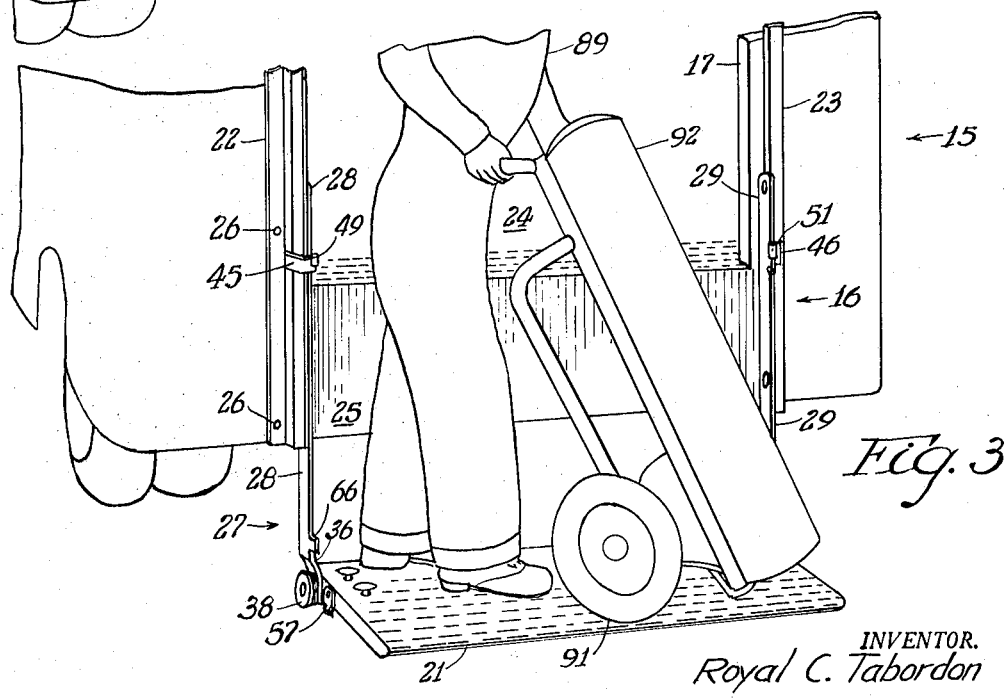
FIG. 3 is a view somewhat similar to FIG. 2, but showing the succeeding stage of elevator operation wherein the weight of the load plus the operator has forced the tail gate platform downward to the level of the ground, against the tension of a counterbalancing spring.

As soon as the platform reaches the end of its descent, or ground level, as shown in FIG. 3, the operator quickly steps on hold-pedal button 102, to dispose the pawl detent 97 against the teeth of ratchet wheel 98, and pushes the hand truck off the platform; to the ground, and finally steps down from the platform himself. The operator's foot must be kept on the button until the hand truck is removed from the platform. At the instant the platform is relieved of the weight of the load the tension in the torsion spring reacts and it firmly urges and engages the nearest ratchet wheel tooth with the pawl detent 97, and thus the elevator platform is held at ground level.

To elevate the platform from such lowered ground level to the truck bed level, the operator steps onto the platform and pulls a return equivalent load onto the platform beside him. He then steps firmly on release pedal 106, which disengages the pawl detent 97 from the teeth of ratchet wheel 98. He then steps up to the truck bed, and as his weight is being shifted from the platform to the truck bed, the elevatable platform means commences to rise, urged up by the spring and the platform thereof is stopped at the truck bed level by means of carriage bar stop lug 66 engaging stop bracket 45. See FIG. 2.

The operator then withdraws the load from the elevator platform 21 and onto the truck bed, whereon the hand truck and return bottle are arranged and located, as desired.

Thereafter, the operator swings the tail gate platform 21 upwardly to a closed position and latches said gate securely by means of latch bolt 57 and catch 59. The truck vehicle is now ready for road travel to another customer location where the above operation can be repeated.

The cable drums 38 and 39, being conoidal spirally grooved, to receive cables 43 and 44 wound spirally therearound, provide means whereby the increasing power of the torsion spring is associated with an increasing diameter of the conoidal drums.

Some characteristic features of this invention are the provision of a tail gate elevator that is self-contained; the provision of a tail gate elevator that is operator-weight controlled; the provision of a tail gate elevator that is spring and operator-weight powered; and the provision of a tail gate elevator wherein conoidal cable drums provide means whereby the increasing power of the torsion spring is associated with an increasing diameter of such conoidal drums.

Obviously many modifications and variations of the present invention are possible in the light of the above teachings. It is therefore to be understood, that within the scope of the appended claims, the invention may be practiced otherwise than as specifically described.

What is claimed and desired to be protected by Letters Patent of the United States is:

1. A tail gate elevator assembly for a vehicle, comprising: a pair of spaced vertical guideways adapted for attachment to a side of such vehicle; elongated bars disposed vertically adjacent said guideways; trunnions projecting from said elongated bars; rollers rotatably mounted on said trunnions and disposed in said guideways for guidance thereby, whereby said elongated bars are reciprocably movable along said guideways, respectively; a horizontal shaft rotatably mounted in and across the lower portions of said elongated bars; a platform pivotally mounted on said shaft said platform being operative to swing from a substantially upright position to a substantially horizontal position; first stop means on said elongated bars for limiting the swing of said platform at said substantially horizontal position; latch means for latching said platform in said substantially upright position; a torsion spring disposed surrounding said shaft, intermediate the ends thereof; first means for adjustably connecting one end of said torsion spring to one of said elongated bars; sleeve means mounted on said shaft for longitudinal movement therealong and to rotate therewith; second means for connecting the other end of said torsion spring to said sleeve means, whereby said movable sleeve means compensates for the variation in length of said torsion spring resulting from tension changes in said torsion spring; second stop means on said guideways for limiting the upward movement of said elongated bars relative to said guideways at a preselected elevation of the associated platform; conoidal drums fixed on said shaft, adjacent said elongated bars, respectively; cables having one end connected to said drums and wound spirally therearound, and the other end anchored to said guideways, respectively; releasable means for holding the elongated bars and associated platform at a selected lower level relative to said second stop means; said torsion spring being tensioned to initially urge said elongated bars against said second stop means, and said cable and drum arrangement being operative to increase the tension in said associated torsion spring as said elongated bars move downwardly relative to said second stop means; and said conoidal drums and cables wound spirally therearound providing means whereby the increasing power of the torsion spring is associated with an increasing dimetral spiral winding of said cables on said conoidal drums.

2. The apparatus of claim 1 wherein the torsion spring is tensioned to initially urge said elongated bars against said second stop means with a counterbalance force at least substantially equal to the weight of the load to be placed on said platform.

3. The apparatus of claim 1 wherein the torsion spring is tensioned to initially urge said elongated bars against said second stop means with a counterbalance force substantially equal to the weight of the load to be placed on said platform.

4. The apparatus of claim 1 wherein the torsion spring is tensioned to initially urge said elongated bars against said second stop means with a counterbalance force substantially equal to the weight of the load to be placed on said platform plus a fraction of the weight of an operator to be carried on said platform.

5. The apparatus of claim 1 wherein the torsion spring is tensioned to initially urge said elongated bars against said second stop means with a counterbalance force substantially equal to the weight of the load to be placed on said platform plus that portion of the weight of an operator, to be carried on said platform, which is in excess of the weight necessary to force down said platform substantially to a predetermined elevation, against the tension of said torsion spring.

6. A tail gate elevator assembly for a vehicle, comprising: a pair of spaced vertical guideways adapted for attachment to a side of such vehicle; carriage means guidable by said guideways, said carriage means including elongated bar means, disposed vertically adjacent said guideways and engageable therewith for guidance therealong, respectively, and a horizontal shaft rotatably carried by said bar means; a platform horizontally supportable on said carriage means; stop means for limiting the upward movement of said carriage means along said guideways; a torsion spring disposed coaxially around said shaft; first means for connecting one end of said torsion spring to said carriage means; second means for connecting the other end of said torsion spring to said shaft to rotate therewith; drums fixed on said shaft, adjacent the sides of said carriage means, respectively, for rotation with said shaft; cables having one end connected to said drums and wound therearound, and the other end of said cables being anchored to said guideways, respectively; releasable means for holding said carriage means at a position relatively lower than said stop means; said torsion spring being tensioned to initially urge said carriage means against said stop means with a counterbalancing force at least substantially equal to the weight of the load to be placed on said platform; and said cable and drum arrangement being operative to increase the tension in said associated torsion spring as said carriage means moves downwardly relative to said stop means.

7. A tail gate elevator assembly for a vehicle comprising: vertical guideway means adapted for attachment to a side of such vehicle; carriage means guidable on said guideway means and movable therealong from a raised position to a relatively lower position; a platform horizontally supportable on said carriage means; stop means for limiting the upward movement of said carriage means along said guideway means; shaft means rotatably carried on said carriage means; a torsion spring disposed coaxially of said shaft means; first means connecting one end of said torsion spring to said carriage means; second means connecting the other end of said torsion spring to said shaft to rotate therewith; drum means fixed on said shaft to rotate therewith; cable means having one end connected to said drum means and wound therearound, the other end of said cable means being connected to said guideway means; means for holding said movable carriage at a position relatively lower than said stop means; said torsion spring being tensioned to initially urge said carriage means against said stop means with a counterbalancing force at least substantially equal to the weight of the load to be placed on said platform; and said cable means and drum means arrangement being operative to increase the tension in said associated torsion spring as said carriage means moves downwardly relative to said stop means.

8. A tail gate elevator assembly for a vehicle, comprising: vertical guideway means; carriage means guidable on said guideway means and movable therealong from a raised position to a relatively lower position; a platform horizontally supportable on said carriage means; stop means for limiting the upward movement of said carriage means along said guideway means; drum means mounted for rotation on said carriage means; a torsion spring; first means connecting one end of said torsion spring to said carriage means; second means connecting the other end of said torsion spring to said drum means, axially thereof, to rotate therewith; cable means having one end connected to said drum means and wound therearound, the other end of said cable means being connected to said guideway means; means for holding said movable carriage at a position relatively lower than said stop means; said torsion spring being tensioned to initially urge said carriage means to a raised position against said stop means with a counterbalancing force at least substantially equal to the weight of the load to be placed on said platform; and said cable means and drum means arrangement being operative to increase the tension of said associated torsion spring as said carriage means moves downwardly relative to said stop means.

9. In a vehicle having a tail gate elevator assembly including an elevatable horizontal platform means movable on vertical guideway means from a raised position to a lowered position, and a stop for limiting the upward movement of said platform means, the improvement comprising spring means connecting said platform means and said guideway means, said spring means being tensioned to initially urge said platform means to a raised position against said stop with a counterbalance force substantially equal to the weight of the load to be placed on said platform means plus a fraction of the weight of an operator to be carried on said platform means.

10. In a vehicle having a tail gate elevator assembly including an elevatable horizontal platform means movable on vertical guideway means from a raised position to a lowered position, and a stop for limiting the upward movement of said platform means, the improvement comprising spring means connecting said platform means and said guideway means, said spring means being tensioned to initially urge said platform means to a raised position against said stop with a counterbalance force substantially equal to the weight of the load to be placed on said platform plus that portion of the weight of an operator, to be carried on said platform means, which is in excess of the weight necessary to force down said platform means substantially to a predetermined elevation, against the tension of said spring means.

References Cited by the Examiner

UNITED STATES PATENTS 2,498,161  2/1950  Hamilton.
2,640,612  6/1953  Barry.

GERALD M. FORLENZA, *Primary Examiner.*

HUGO O. SCHULZ, *Examiner.*

R. G. SHERIDAN, *Assistant Examiner.*